United States Patent [19]

Ovshinsky et al.

[11] Patent Number: 5,506,069
[45] Date of Patent: Apr. 9, 1996

[54] ELECTROCHEMICAL HYDROGEN STORAGE ALLOYS AND BATTERIES FABRICATED FROM MG CONTAINING BASE ALLOYS

[75] Inventors: Stanford R. Ovshinsky, Bloomfield Hills; Michael A. Fetcenko, Rochester Hills, both of Mich.

[73] Assignee: Ovonic Battery Company, Inc., Troy, Mich.

[21] Appl. No.: 259,793

[22] Filed: Jun. 14, 1994

Related U.S. Application Data

[63] Continuation-in-part of Ser. No. 136,066, Oct. 14, 1993, Pat. No. 5,407,761.

[51] Int. Cl.$^6$ ...................................... H01M 4/38
[52] U.S. Cl. ........................... 429/59; 420/402; 420/441; 420/900
[58] Field of Search .................. 420/402, 441, 420/900; 429/59; 164/71.1, 124, 488

[56] References Cited

U.S. PATENT DOCUMENTS

| | | | |
|---|---|---|---|
| 4,582,117 | 4/1986 | Kushnick | 164/71.1 X |
| 4,623,597 | 11/1986 | Sapru et al. | 420/900 X |
| 4,789,022 | 12/1988 | Ohno | 164/124 X |
| 5,198,207 | 3/1993 | Knott et al. | 420/900 X |

FOREIGN PATENT DOCUMENTS

| | | | |
|---|---|---|---|
| 55-149101 | 11/1980 | Japan | 429/900 |
| 61-199045 | 9/1986 | Japan | 429/900 |

*Primary Examiner*—Stephen Kalafut
*Attorney, Agent, or Firm*—Marvin S. Siskind; Marc J. Luddy; David W. Schumaker

[57] ABSTRACT

An electrochemical hydrogen storage material comprising:

$$(\text{Base Alloy})_a M_b$$

where, Base Alloy is an alloy of Mg and Ni in a ratio of from about 1:2 to about 2:1, preferably 1:1; M represents at least one modifier element chosen from the group consisting of Co, Mn, Al, Fe, Cu, Mo, W, Cr, V, Ti, Zr, Sn, Th, Si, Zn, Li, Cd, Na, Pb, La, Mm, and Ca; b is greater than 0.5, preferably 2.5, atomic percent and less than 30 atomic percent; and a+b=100 atomic percent. Preferably, the at least one modifier is chosen from the group consisting of Co, Mn, Al, Fe, and Cu and the total mass of the at least one modifier element is less than 25 atomic percent of the final composition. Most preferably, the total mass of said at least one modifier element is less than 20 atomic percent of the final composition.

15 Claims, No Drawings

ELECTROCHEMICAL HYDROGEN STORAGE ALLOYS AND BATTERIES FABRICATED FROM MG CONTAINING BASE ALLOYS

CONTINUING INFORMATION

The present invention is a continuation-in-part of U.S. patent application Ser. No. 08/136,066 filed Oct. 14, 1993 now U.S. Pat. No. 5,407,761.

FIELD OF THE INVENTION

The present invention relates to electrochemical hydrogen storage alloys and rechargeable electrochemical cells using these alloys.

More particularly, the invention relates to nickel metal hydride (Ni-MH) rechargeable cells and batteries having negative electrodes formed of MgNi based electrochemical hydrogen storage alloys. In addition to lower cost, cells that incorporate the alloys of the invention have performance characteristics that are as good as or better than known rechargeable cells using hydrogen storage alloys such as cycle life, charge retention, low temperature, energy density, and especially high storage capacity.

BACKGROUND OF THE INVENTION

Rechargeable cells that use a nickel hydroxide positive electrode and a metal hydride forming hydrogen storage negative electrode ("metal hydride cells") are known in art.

Generally, when an electrical potential is applied between the electrolyte and a metal hydride electrode in a metal hydride cell, the negative electrode material (M) is charged by the electrochemical absorption of hydrogen and the electrochemical evolution of a hydroxyl ion; upon discharge, the stored hydrogen is released to form a water molecule and evolve an electron:

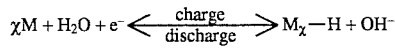

The reactions that take place at the positive electrode of a nickel metal hydride cell are also reversible. Most metal hydride cells use a nickel hydroxide positive electrode. The following charge and discharge reactions take place at a nickel hydroxide positive electrode:

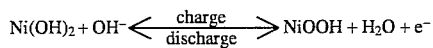

In a metal hydride cell having a nickel hydroxide positive electrode and a hydrogen storage negative electrode, the electrodes are typically separated by a non-woven, nylon or polypropylene separator. The electrolyte is usually an alkaline aqueous electrolyte, for example, 30 weight percent potassium hydroxide.

The first hydrogen storage alloys to be investigated as battery electrode materials were TiNi and LaNi$_5$. Many years were spent in studying these simple binary intermetallics because they were known to have the proper hydrogen bond strength for use in electrochemical applications. Despite extensive efforts, however, researchers found these intermetallics to be extremely unstable and of marginal electrochemical value due to a variety of deleterious effects such as slow discharge and poor cycle life brought about by oxidation, corrosion, poor kinetics, and poor catalysis. These simple alloys for battery applications reflect the traditional bias of battery developers toward the use of single element couples of crystalline materials such as NiCd, NaS, LiMS, ZnBr, NiFe, NiZn, and Pb-acid. In order to improve the electrochemical properties of the binary intermetallics while maintaining the hydrogen storage efficiency, early workers began modifying TiNi and LaNi$_5$ based alloys.

In U.S. Pat. No. 4,623,597 (the '597 patent), the contents of which are incorporated by reference, one of the present inventors, Ovshinsky, described disordered multicomponent materials for use as negative electrodes in electrochemical cells for the first time. In this patent, Ovshinsky describes how disordered materials can be tailor made to greatly increase hydrogen storage and reversibility characteristics. Such disordered materials are amorphous, microcrystalline, and/or polycrystalline (lacking long range compositional order). The framework of active materials of these disordered materials consist of a host matrix of one or more elements and modifiers incorporated into this host matrix. The modifiers enhance the disorder of the resulting materials and thus create a greater number and spectrum of catalytically active sites and hydrogen storage sites. Multiorbital modifiers provide a greatly increased number of storage sites due to various bonding configurations, orbital overlap, and hence a spectrum of bonding sites. Due to the different degrees of orbital overlap and the disordered structure, an insignificant amount of structural degradation occurs during charge/discharge cycles or rest periods between charge/discharge cycles resulting in long cycle life and shelf life.

The '597 patent marks the beginning of Ovshinsky's modification program of TiNi and LaNi$_5$ based alloys at Energy Conversion Devices (ECD) of Troy, Mich. The present invention represents a departure by Ovshinsky and his team and the development of a new family of alloys.

The '597 patent describes disordered battery materials produced from Ti-Ni and Mg-Ni. The described Mg-Ni disordered materials had a capacity as high as 566 mAh/g. However, a number of practical problems, such as the metallurgical differences between Mg and Ni made further development and fabrication of these materials particularly difficult at the time. Thus, the pioneering principles described in the '597 patent were initially applied to Ti-Ni based materials. Subsequently, these evolved into Ti-V-Zr-Ni type active materials such as disclosed in U.S. Pat. No. 4,551,400 ("the '400 Patent") to Sapru, Hong, Fetcenko, and Venkatesan, the disclosure of which are incorporated by reference.

SUMMARY OF THE INVENTION

One aspect of the present invention is an electrochemical hydrogen storage material comprising:

where, Base Alloy is an alloy of Mg and Ni in a ratio of from about 1:2 to about 2:1; M represents at least one modifier element chosen from the group consisting of Co, Mn, Al, Fe, Cu, Mo, W, Cr, V, Ti, Zr, Sn, Th, Si, Zn, Li, Cd, Na, Pb, La, Mm, and Ca; b is greater than 0.5, preferably 2.5, atomic percent and less than 30 atomic percent; and a+b=100 atomic percent. Preferably, at least one modifier is chosen from the group consisting of Co, Mn, Al, Fe, and Cu and the total mass of the at least one modifier element is less than 25 atomic percent of the final composition. Most preferably, the total mass of said at least one modifier element is less than 20 atomic percent of the final composition.

Another aspect of the present invention is an electrochemical hydrogen storage cell containing the electrochemical hydrogen storage material described above.

An additional aspect of the present invention is a method for fabricating the electrochemical hydrogen storage material comprising described above Using rapid solidification by a method chosen from a group consisting of melt spinning, gas atomization, centrifugal atomization, and planar flow casting.

DESCRIPTION OF THE INVENTION

Over the years, Ovshinsky and his group have developed and refined Ti-Ni materials as described in detail in the following U.S. Patents, some of which are discussed above:

a) U.S. Pat. No. 4,551,400, (describing $(VTiZrNi)_{1-y}M_y$ materials)

b) U.S. Pat. No. 4,637,967, (describing metal hydride alloys that are amorphous and self supporting), c) U.S. Pat. No. 4,728,586, (describing $(Ti_{2-x}Zr_xV_{4-y}Ni_y)_{1-z}Cr_z$ materials), d) U.S. Pat. No. 5,096,667, (describing $(VNiTiZrCr)_aCo_b\text{-}Mn_cAl_d$ materials), e) U.S. Pat. No. 5,104,617, (describing "$(V_{1-y}Ni_yTi_{1-x}Zr_x\text{-}Cr_x)_aM^i_bM^{ii}_cM^{iii}_dV_e$" materials), d) U.S. Pat. No. 5,135,589, (describing a metastable rapidly solidified alloy— $V_{1-y}Ni_yTi_{1-x}Zr_xCr_x$), e) U.S. Pat. No. 5,238,756, (describing an electrode alloy containing V-Ni-T-Zr-Cr-Co-Fe-Mn-Al), and f) U.S. Pat. No. 5,277,999, describing (Base alloy)$_a$Co$_b$-Mn$_c$Al$_d$Fe$_e$La$_f$Mo$_g$ materials).

As mentioned above, Mg-Ni disordered materials were not actively developed, because they had a number of practical problems, such as chemical and metallurgical differences (e.g., dissimilar melting points and vapor pressure). In addition, Mg is different in atomic size from the host metals used in present day advanced Ni-MH materials.

Quite unexpectedly, as a result of their experience gained from developing Ti-Ni based alloys of every increasing complexity, Ovshinsky and his team have discovered a variety of improved Mg-Ni based materials for battery alloys that appear capable of sustaining the continued improvement of nickel metal hydride battery systems.

Ni is thermodynamically destabilizing in the MH alloy. This destabilization acts to bring the bond strength of Mg, V, Ti, and Zr with hydrogen down. Ni is also useful because it provides corrosion resistance in an alkaline environment.

The present invention represents a significant change from the highly modified multicomponent materials that have been developed from LaNi$_5$ and TiNi. The present invention uses MgNi as the basis to develop a new family of negative electrode materials. This work required an analytical approach on different levels. First, the inventors sought multi-orbital modifiers, for example transition elements, that would provide a greatly increased number of storage sites due to the various bonding configurations available in order to produce an increase in energy density. Second, the inventors had to look for modifiers and methods that would stabilize Mg as well as provide sufficient balance to the passivation/corrosion characteristics of the resulting alloy. This is because unrestrained corrosion leads to poor cycle life and passivation results in low capacity, poor discharge rate performance, and poor cycle life.

Modification of MgNi materials is complicated because Mg does not have the tolerance for substitution that transition metals have. Further, MgNi based materials do not tolerate the wide latitude of precipitated phases formed during alloy solidification. In other words, alloys of the V-Ti-Zr-Ni type may precipitate as a multitude of crystallographic phases during solidification and still result in efficiently operating alloys capable of operating in an alkaline battery environment. This is problematic with MgNi based materials.

The MgNi host matrix materials of the present invention are, more specifically, high specific capacity electrochemical hydrogen storage alloys composed of a Base Alloy comprising a MgNi host matrix. This MgNi host matrix is an alloy of Mg and Ni in a ratio of about 1:2 to about 2:1, preferably about 1:1. The Base Alloy of the invention is modified by at least one modifier element chosen from the group consisting of Co, Mn, Al, Fe, Cu, Mo, W, Cr, V, Ti, Zr, Sn, La, Mm, and Ca where the total mass of the at least one modifier element is greater than 0.5, preferably 2.5, atomic percent and less than 30 atomic percent of the final composition.

Another embodiment of the present invention contemplates the preparation of the alloys of the invention via rapid solidification such as jet casting, melt spinning, gas atomization, ultrasonic atomization, centrifugal atomization, and planar flow casting. It is considered that these methods may be followed by powder fabrication techniques such as mechanical crushing/grinding or hydride/dehydride cycling. Consequently, direct powder from melt techniques such as gas atomization are preferred.

The inventors have found through extensive analysis that the properties of the MgNi Base Alloy can be controllably altered depending on the type and quantity of modifier elements selected for making the negative electrode materials as well as precipitation conditions. In general, the negative electrode alloys of the present invention are resistant to degradation by poisoning, a property that also contributes to long cycle life. (Poisoning is a particular problem with unmodified MgNi materials such as those described in the '597 patent.) It is believed that this material has so many active sites that the material resists poisoning because poisonous species can be bound to a number of these sites without significantly decreasing the number of active sites. The materials thus formed have a very low self discharge and hence good shelf life.

The microstructure of the materials of the current invention can be anywhere along the following continuum:

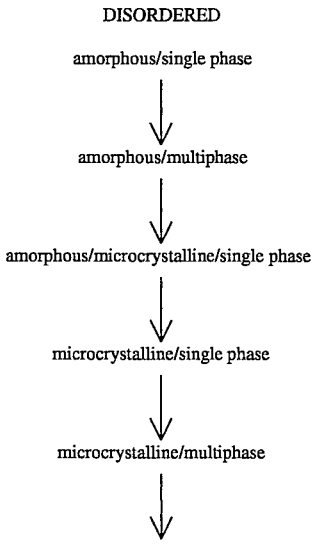

polycrystalline/single phase

↓ polycrystalline/multiphase

↓ single crystal/single phase

ORDERED

As mentioned above, MgNi based materials do not tolerate the wide latitude of precipitated phases formed during alloy solidification. At present, it appears that the MgNi based materials are more amendable to rapid solidification techniques. The microstructure of the current materials can consist of multiple phases of different microstructures such as amorphous/single crystal materials. Without wishing to be bound by theory, the present inventors believe that the optimization of modifiers is more critical in materials having an ordered microstructure (single crystal/single phase) and tends to decrease as the microstructure becomes more disordered (amorphous/single phase). This phenomenon is illustrated in the Examples, that show an increase in energy density as the substrate temperature decreases.

The affects of the addition of Co can be seen in negative electrode materials of the present invention having the composition of formula (1)

$$(\text{Base Alloy})_a \text{Co}_b \quad (1)$$

where b is 0.5 to 8.0 atomic percent, preferably 2.5 to 5.5 atomic percent. Without wishing to be bound by theory, the presence of Co results in reduced oxide thickness; a conductive and/or catalytic component on the surface; and the reduction of species like the hydroxyl ion. While Co does oxidize and is soluble, it is also believed that cobalt oxide can act to inhibit the oxidation of other elements. Further, it is believed that in the alloys of the present invention, Co alters the microstructure in such a way as to introduce changes in the mutual solubility of the elements of these alloys, wherein hydrogen in a particular phase is not easily discharged either through low surface area, or an oxide of limited porosity or catalytic property.

The role of Mn is observed in negative electrode materials having composition (2):

$$(\text{Base Alloy})_a \text{Co}_b \text{Mn}_c \quad (2)$$

where b is 0.1 to 8.5, preferably 3.5 to 5.5 atomic percent; c is 0.1 to 8.5, preferably 4.5 to 8.5 atomic percent; $b+c \geq 0.5$ atomic percent and $a+b+c=100$ atomic percent.

In the alloys of formula (2), the addition of Mn yields enhanced low temperature performance as well as increased hydrogen storage capacity. Though not wishing to be bound by theory, it is believed that when Mn is present without Fe, Mn assists the electrochemical discharge reaction at low temperature by promoting bulk diffusion of hydrogen at low temperature and also by catalyzing the reaction of hydrogen and hydroxyl ions at the alloy surface. Because of the low temperature properties of the formula (2) alloys, it appears that Mn's catalytic properties are emphasized when Fe is not present, or at least present in only low concentrations.

Other effects of the materials of the present invention are satisfied by negative electrode materials containing Al, having the composition $$(\text{Base Alloy})_a \text{Co}_b \text{Mn}_c \text{Al}_d \text{Cu}_e \quad (3)$$

where b=0.1 to 10.0, preferably 2.0 to 8.5 atomic percent; c=0.1 to 10.0, preferably 2.5 to 8.5 atomic percent; d=0.1 to 10.0, preferably 2.5 to 8.5 atomic percent; e=0.1 to 10, preferably 2.5 to 8.5 atomic percent; $b+c+d+e \geq 0.5$, preferably 2.5, atomic percent; and $a+b+c+d+e=100$ atomic percent.

In the materials of formula (3), one can observe that the hydrogen storage capacity increases while excellent stability and catalysis is retained. Though not wishing to be bound by theory, it is believed that Mn alters the microstructure and acts as a catalyst at the electrochemically active surface oxide. In addition, Cu and Al act to improve electrochemical capacity. Without wishing to be bound by theory, it is believed that this higher specific capacity is obtained through improved catalysis that results from improved hydrogen bulk diffusion through the alloy or through grain boundaries, higher surface area, and elimination of deleterious phases or surface conditions allowing more complete charge and/or discharge. In addition, both Cu and Al may act to increase the midpoint voltage on discharge and/or decrease internal resistance in a sealed cell (decrease polarization in a flooded cell); and to increase discharge voltage.

Other effects of the materials of the present invention are satisfied by an electrochemical cell comprising a negative electrode having the composition $$(\text{Base Alloy})_a \text{Mn}_b \text{Fe}_c \quad (4)$$

where b is 0.1 to 8.5, preferably 3.5 to 5.5 atomic percent; c is 0.1 to 8.5, preferably 4.5 to 8.5 atomic percent; $b+c \geq 0.5$, preferably 2.5, atomic percent and $a+b+c=100$ atomic percent.

It is also possible to substitute Mn for Co. The use of Mn will result in increased storage capacity and low temperature capability as well as low cell pressure and high cycle life. Though not wishing to be bound by theory, it is believed that in the alloys of the present invention, Mn alters the microstructure in such a way that the precipitation of phases having hydrogen bond strengths outside of the range of electrochemical usefulness is inhibited. One way in which Mn appears to accomplishes this is by increasing the mutual solubility of the other elements within the primary phases during solidification. In addition, Mn functions at the electrochemically active surface oxide as a catalyst. The multiple oxidation states of Mn are believed to catalyze the electrochemical discharge reaction by increasing the porosity, conductivity, and surface area of the active surface oxide film.

Quite unexpectedly, embodiments of the present invention, that contain Fe and Mn, exhibit significantly improved charge retention compared to the prior art. In addition, such alloys exhibit excellent low temperature performance as well as a significant improvement in cycle life and other performance characteristics. Such embodiments have a very low pressure during operation and exhibit long cycle life, high rate discharge, substantially increased hydrogen storage capacity, improved charge retention, and improved low temperature discharge capability.

The improved performance of these compositions has been accomplished by the unexpected discovery that the beneficial effects of Mn added to the inventive compositions in the characteristics of low temperature performance can be inhibited by an unoptimized quantity of Fe. In particular, the inventors discovered that Fe in the quantities of about 0.1 to 3 atomic percent and more particularly 1 to 2 atomic percent improved low temperature capability compared to similar alloys having Fe at a level of about 6 atomic percent. In addition, the inventors discovered that the lower quantity of Fe still provides the beneficial effect of improved cycle life.

It is possible that the modifier elements of the Base Alloy of the present invention, particularly Mn and Fe, and most particularly Co, either alone, or in combination with Mn and/or Al for example, act to catalyze oxygen reduction, thereby avoiding or reducing the oxidation of the surrounding elements in the metal hydride alloy. It is believed that this function of the modified alloys reduces or even eliminates the formation and build up of detrimental surface oxide, thereby providing a thinner and more stable surface.

In addition to these affects, and quite unexpectedly, we found that the combination of Mn and excess Fe retards the low temperature capability benefits of Mn even though room temperature discharge rate capability may be unaffected.

Though not wishing to be bound by theory, it is believed that several additional factors may explain the unexpected behavior of Mn and Fe in the Base Alloys of the present invention:

(1) The combination of Mn and excess Fe may affect the alloy by inhibiting the diffusion rate of hydrogen within the metal through the formation of complex phase structures, either by effecting the grain boundaries or by affecting the equilibrium bond strength of hydrogen within the metal. In other words, the temperature dependance of the hydrogen bond strength may be increased thereby decreasing the available voltage and capacity available under low temperature discharge.

(2) It is believed that the combination of Mn and excess Fe may result in a lower electrode surface area for metallurgical reasons by increasing the ductility of the alloy and thereby reducing the amount of surface area formation during the activation process.

(3) It is believed that the combination of Mn and excess Fe to these alloys may inhibit low temperature discharge through the alteration of the oxide layer itself with respect to conductivity, porosity, thickness, and/or catalytic activity. The oxide layer is an important factor in the discharge reaction and promotes the reaction of hydrogen from the Base Alloy of the present invention and hydroxyl ion from the electrolyte. The inventors believe this reaction is promoted by a thin, conductive, porous oxide having some catalytic activity.

The combination of Mn and excess Fe does not appear to be a problem under room temperature discharge, but has shown a surprising tendency to retard the low temperature reaction. The formation of a complex oxide could result in a subtle change in oxide structure such as pore size distribution or porosity. Since the discharge reaction produces water at the metal hydride surface and within the oxide itself, a small pore size may be causing a slow diffusion of $K^+$ and $OH^-$ ions from the bulk of the electrolyte to the oxide. It appears that room temperature discharge where polarization is almost entirely ohmic and low temperature discharge where activation and concentration polarization components dominate the physical structure of the oxides with Fe and Mn compared to Mn alone could be substantially different.

Still another possible explanation is that the Mn and Fe have multivalent oxidation states. It is considered that some elements within the oxide may in fact change oxidation state during normal state of charge variance as a function of the rate of discharge and can exhibit temperature, fabrication, and compositional dependance. It is possible these multiple oxidation states have different catalytic activity as well as different densities that together effect oxide porosity.

A possible problem with a complex oxide containing both Mn and excess Fe could be that the Fe component retards the ability of the Mn to change oxidation state if present in large quantities.

The beneficial effects of Mn and Fe have also been detailed in U.S. Pat. No. 5,096,667, U.S. Pat. No. 5,104,617, and U.S. Pat. No. 5,238,756 the contents of which are incorporated by reference.

It is noted in U.S. Pat. No. 5,104,617 that it was widely believed that the inclusion of Fe in metal hydride hydrogen storage alloy materials would deleteriously effect electrochemical performance. This belief was due to the knowledge that Fe readily oxidizes and corrodes, particularly in the presence of an alkaline electrolyte. Oxidation reduces the performance of a metal hydride electrode in many ways, and oxides of Fe were known in the prior art to adversely affect the nickel hydroxide positive electrode, particularly with respect to charging efficiency and thus capacity and cycle life.

The addition of a small amount of La can be useful in increasing hydrogen storage capacity as well as low temperature capacity. In particular, the purity of the La used is not critical to the present invention, and various forms of mischmetal appear to be as effective as high purity La. Thus, as used herein, La includes high purity La and/or mischmetal, where the mischmetal rare earth component may consist of any of the numerous commercially available materials some of which may contain La in high or low amounts, or even none.

While not wishing to be bound by theory, it is believed that the addition of La has several functions:

(1) La functions as a hydride. While La in the form of $LaNi_5$ absorbs considerable quantities of hydrogen, La in $LaNi_5$ is easily oxidized and corroded in alkaline medium. However, this corrosion is not observed in the alloys of the present invention. It is believed that the compositions of the present invention that include La, such as those described by the above general formula "protect" the La from corrosion without interfering with La absorption of hydrogen.

(2) La acts to remove impurities during the melting process. During high temperature melting, it is believed that the La absorbs impurities such as oxygen because it has a high free energy for formation of oxides. It is believed that oxygen is effectively removed from interstitial sites in the standard alloy to reside in the La rich impurity phases, thus providing increased storage sites in the basic alloy.

(3) La in higher concentrations appears to assists low temperature discharge in the same manner as it removes oxygen. It appears that light element impurities play a key role in inhibiting first hydrogen diffusion during low temperature discharge. The elimination of these impurities by the use of La or any other "impurity getter," would thus be the key factor in promoting good low temperature discharge.

Throughout the preceding discussion with respect to the oxide it should be noted that the Base Alloy also contains Mg and Ni, the components of the Base Alloy, and can also contain different modifier elements. The discussion of modifier elements presented above is merely for the sake of brevity and one skilled in the art should not infer that the actual mechanism cannot also include a different or more complex explanation involving these and other such elements. Specifically incorporated by reference is the discussion of modifiers contained in U.S. Pat. No. 5,407,761 and the patents it is continued from.

Negative electrodes using alloys of the present invention can be used in many types of hydrogen storage cells and batteries. These include flat cells having a substantially flat plate negative electrode, a separator, and a positive electrode or counter electrode that is substantially flat and aligned to be in operative contact with the negative electrode; jelly-roll cells made by spirally winding a flat cell about an axis; and prismatic cells for use in electric vehicles, for example. The metal hydride cells of the present invention can use any appropriate kind of container, and can be constructed, for example of metal or plastic.

A 30 weight percent aqueous solution of potassium hydroxide is a preferred electrolyte.

In a particularly preferred embodiment, alloys used in conjunction with advanced separator materials as disclosed in U.S. patent application Ser. No. 07/879,823 (allowed) and/or advanced positive electrode materials as disclosed in U.S. patent application Ser. Nos. 07/975,031 and 08/027,973 (both allowed) yield improved performance over prior art alloys for certain electrochemical applications.

Besides the improved technical performance discussed above, modification offers cost advantages of almost an order of magnitude compared to conventional metal hydride alloys. This is, of course, in addition to the cost reduction in resulting from the use of MgNi as the Base Alloy compared to previously described Ti-V-Zr-Ni-Cr based materials that are about ten times more expensive than MgNi materials.

EXAMPLES

Example 1

A series of MgNi Base Alloy films with different chemical compositions were deposited on nickel substrates using rf-sputtering. The fabrication of amorphous thin films by rf-sputtering is well known in the literature. Three different substrate temperatures were used, 100° C. (no intentional heating or cooling), 0° C. (cooling with ice), and 77K (cooling with liquid nitrogen). The resulting film thicknesses were about 1 to 3 microns.

Chemical compositions of the deposited thin films were measured by x-ray energy discursive spectroscopy (EDS) analysis and the structures were examined by x-ray diffraction (XRD) analysis. All of the samples prepared by rf-sputtering have an amorphous or microcrystalline toward amorphous structure. The electrochemical energy density was measured in a galvanic cell using $Ni(OH)_2$ as the counter electrode and 30 weight percent KOH as the electrolyte. Charging was accomplished using a charge current density of 25 mA/g for 30 hours. The discharge cut-off voltage was set to 0.9V between the negative and positive electrodes.

Table 1.1 summarizes the energy density of a thin film deposited on a substrate that received no additional heating or cooling and thus was at about 100° C. The modified MgNi Base Alloy thin film was prepared according to the present invention. An unmodified Base Alloy is presented for comparison.

TABLE 1.1

| Thin Film Energy Density (100° C.) | |
| --- | --- |
| alloy | mAh/g |
| $Mg_{58}Ni_{42}$ | 193 |
| $Mg_{54.3}Ni_{41.9}Co_{3.8}$ | 408 |

Without wishing to be bound by theory, these results appear to indicate, that the use of appropriate modifiers, as a cumulative result of the specific characteristics discussed above, will result in an increase in capacity.

Table 1.2 summarizes the energy density of thin films deposited on a substrate maintained at 0° C. through the use of an ice bath. The modified MgNi Base Alloys are embodiments of the present invention. An unmodified Base Alloy is presented for comparison.

TABLE 1.2

| Thin Film Energy Density (0° C.) | |
| --- | --- |
| alloy | mAh/g |
| $Mg_{50}Ni_{50}$ | 171 |
| $Mg_{46.7}Ni_{45.7}Co_{7.6}$ | 414 |
| $Mg_{50.6}Ni_{42}Co_{7.4}$ | 540 |
| $Mg_{50.9}Ni_{44.1}Co_5$ | 401 |
| $Mg_{52.3}Ni_{45.2}Co_{2.5}$ | 639 |
| $Mg_{54.3}Ni_{43.2}Co_{2.5}$ | 528 |

Without wishing to be bound by theory, these results appear to indicate, that the effectiveness of appropriate modifiers, as a cumulative result of the specific characteristics discussed above, is effected by the substrate temperature.

Table 1.3 summarizes the energy density of thin films deposited on a substrate maintained at 77K through the use of liquid nitrogen. The modified MgNi alloys are embodiments of the present invention. An unmodified Base Alloy is presented for comparison.

TABLE 1.3

| Thin Film Energy Density (77 K.) | |
| --- | --- |
| alloy | mAh/g |
| $Mg_{57}Ni_{43}$ | 292 |
| $Mg_{53}Ni_{44}Co_3$ | 604 |
| $Mg_{52.1}Ni_{45.1}Co_{2.8}$ | 720 |
| $Mg_{55.1}Ni_{42.1}Co_{2.8}$ | 537 |
| $Mg_{45.9}Ni_{48.9}Co_{5.2}$ | 451 |
| $Mg_{52.4}Ni_{42.4}Co_{5.2}$ | 401 |
| $Mg_{35}Ni_{49}Co_{4.4}Mn_4Al_{2.7}Cu_{4.9}$ | 417 |

Without wishing to be bound by theory, these results appear to indicate, that the effectiveness of appropriate modifiers, as a cumulative result of the specific characteristics discussed above, is effected by the substrate temperature. In addition, this table confirms that the amorphous and microcrystalline materials that result from deposition on a 77K substrate are a preferable microstructure for these materials. Table 1.1, 1.2, and 1.3 indicate that substrate cooling is important. Without wishing to be bound by theory, the inventors believe that this is because substrate cooling tends to favor the formation of materials having a microstructure that trends toward amorphous. As discussed above, amorphous and amorphous/microcrystalline materials appear less sensitive to modifier optimization and thus are the preferred microstructures. These and other investigations indicate that the minimum effective amount of modifier(s) that must be present is 0.5, preferably 2.5, atomic percent.

Example 2

A series of MgNiCo films with different chemical compositions were deposited on nickel substrates using rf-sputtering as described above. For this example, two different substrate temperatures were used, 0° C. (ice) and 77K (liquid nitrogen cooling). The resulting film thicknesses were about 1 to 3 microns.

Chemical compositions were measured by x-ray energy discursive spectroscopy (EDS) analysis and the structures were examined by x-ray diffraction (XRD) analysis. All of the described materials had an amorphous or microcrystalline toward amorphous structure. The electrochemical energy density was measured as described in Example 1.

Table 2.1 summarizes the energy density of the MgNiCo thin films deposited at 0° C. The best result was obtained from a film with a composition of $Mg_{52.3}Ni_{45.2}Co_{2.5}$. It exhibited an energy density of 639 mAh/g at a discharge current of 50 mA/g. This material had an amorphous/microcrystal line microstructure.

TABLE 2.1

MgNiCo Thin Films Energy Density (0° C.)

| Mg(%) | Ni(%) | Co(%) | mAh/g |
|---|---|---|---|
| 50.3 | 47.2 | 2.5 | 494 |
| 52.3 | 45.2 | 2.5 | 639 |
| 54.3 | 43.2 | 2.5 | 576 |
| 42.8 | 52.0 | 5.2 | 588 |
| 50.9 | 44.1 | 5.0 | 423 |
| 54.8 | 40.2 | 5.0 | 415 |
| 46.9 | 46.9 | 6.2 | 543 |
| 37.7 | 54.6 | 7.7 | 421 |
| 41.7 | 50.6 | 7.7 | 407 |
| 46.7 | 45.7 | 7.6 | 414 |
| 50.6 | 42.0 | 7.4 | 569 |

Table 2.2 shows the results of MgNiCo thin films deposited at 77K. The best result was obtained for a $Mg_{52.1}Ni_{45.1}Co_{2.8}$ film. This film had an energy density of 720 mAh/g at a discharge current of 50 mA/g. This material exhibits superior capacity when compared to conventional metal hydride alloys. This material had an amorphous/microcrystalline microstructure.

TABLE 2.2

MgNiCo Thin Films Energy Density (77 K.)

| Mg(%) | Ni(%) | Co(%) | mAh/g |
|---|---|---|---|
| 43.9 | 53.3 | 2.8 | 508 |
| 52.1 | 45.1 | 2.8 | 720 |
| 55.1 | 42.1 | 2.8 | 570 |
| 45.9 | 48.9 | 5.2 | 451 |
| 52.4 | 42.4 | 5.2 | 653 |
| 39.0 | 54.0 | 7.0 | 578 |
| 43.0 | 50.0 | 7.0 | 662 |
| 41.9 | 50.9 | 7.2 | 537 |
| 44.8 | 46.8 | 8.4 | 415 |
| 48.1 | 43.0 | 8.9 | 464 |
| 52.3 | 38.8 | 8.9 | 535 |

Example 3

Three samples of unoptimized compositions were deposited on nickel substrates using rf-sputtering as described in Example 1. The results and substrate temperatures are shown in Table 3.1. The degradation due to cycling is less than 20% up to 20 cycles in a flooded, half cell.

The capacities shown in Table 3.1 are below those shown in Examples 1 and 2. This indicates that careful optimization of the Base Alloy and modifiers is necessary and, preferably, such optimization is combined with fabrication methods that produce an amorphous or amorphous/microcrystalline microstructure such as jet casting, melt spinning, gas atomization, ultrasonic atomization, centrifugal atomization, and planar flow casting. However, the capacity stability over cycling is remarkable for these types of Mg based alloys.

TABLE 3.1

Capacity of Cycled MgNiCo Thin Films

| Sub. Temp | 77 K. $Mg_{41.9}Ni_{50.9}Co_{7.2}$ | 77 K. $Mg_{44.8}Ni_{46.8}Co_{8.4}$ | 0° C. $Mg_{37.7}Ni_{54.6}Co_{7.77}$ |
|---|---|---|---|
| Cycle #1 | 260 | 292 | 322 |
| Cycle #2 | 371 | 287 | 308 |
| Cycle #3 | 305 | 378 | 380 |
| Cycle #4 | 357 | 367 | 343 |
| Cycle #5 | 344 | 356 | 334 |
| Cycle #6 | 334 | 336 | 332 |
| Cycle #7 | 341 | 343 | 328 |
| Cycle #8 | 338 | 331 | 328 |
| Cycle #9 | 320 | 328 | 326 |
| Cycle #10 | 330 | 328 | 323 |
| Cycle #11 | 306 | 305 | 297 |
| Cycle #12 | 303 | 314 | 310 |
| Cycle #13 | 301 | 313 | 310 |
| Cycle #14 | 300 | 305 | 307 |
| Cycle #15 | 294 | 302 | 306 |
| Cycle #16 | 321 | 316 | 322 |
| Cycle #17 | 313 | 324 | 323 |
| Cycle #18 | 309 | 315 | 310 |
| Cycle #19 | 294 | 313 | 304 |
| Cycle #20 | 298 | 294 | 301 |

Four samples of unoptimized compositions were deposited on nickel substrates using rf-sputtering as described in Example 1 at a substrate temperature of 77K. These materials were discharged at variable rates and their energy densities measured. The results are shown in Table 3.2.

TABLE 3.2

MgNiCo Thin Films Energy Density at Variable Rates

| alloy | 25 mA/g | 50 mA/g | 100 mA/g |
|---|---|---|---|
| $Mg_{41.9}Ni_{50.9}Co_{7.2}$ | 537 | 466 | 432 |
| $Mg_{42.8}Ni_{52.0}Co_{5.2}$ | 588 | 567 | 522 |
| $Mg_{43.0}Ni_{50.0}Co_{7.0}$ | 662 | 595 | 467 |
| $Mg_{52.4}Ni_{42.4}Co_{5.2}$ | 653 | 493 | 412 |

Example 4

The pressure-composition isotherm (PCT) technique is widely used to determine the hydrogen storage capacity of gaseous hydrogen. While gas phase storage of hydrogen does not guarantee that a particular material is Capable of storing hydrogen in an electrochemical cell, gas phase storage can be a useful technique for evaluating the limits of hydrogen storage for known electrochemical materials. Usually, the measured storage capacity of gaseous hydrogen can be used as an indicator of the upper limit of the electrochemical energy density in a wet cell. On this basis, one weight percent of hydrogen storage is equivalent to 268 mAh/g in an electrochemical cell.

PCT measurements were performed on a $Ti_{18}Zr_{15}V_{18}Ni_{29}Cr_5Co_7Mn_8$ alloy and a $Mg_{52}Ni_{48}$ alloy thin film. The $Ti_{18}Zr_{15}V_{18}Ni_{29}Cr_5Co_7Mn_8$ alloy was taken from an ingot produced as negative electrode material for sealed cells. The $Mg_{52}Ni_{48}$ thin film was deposited on an aluminum foil target 5 inches in diameter using rf sputtering deposition at room temperature. The average film thickness was about 5 mm and the total weight of the active material was 0.36 g. The resulting PCT data are listed in Table 5. These results show the hydrogen storage capacity of Mg-based alloy of the present invention are twice that of standard V-Ti-Zr-Ni based alloys at 8000 Torr. Further optimization is expected to make this doubled storage capacity utilizable at about 1–2 atmospheres of pressure.

TABLE 4

| | Hydrogen Concentration H/(H + M) % at Different Equilibrium Pressures | | | | | | |
|---|---|---|---|---|---|---|---|
| | 100 Torr | 200 Torr | 500 Torr | 1000 Torr | 2000 Torr | 5000 Torr | 8000 Torr |
| TiZrVNi CrCoMn | .25% | .38% | .61% | .80% | 1.01% | 1.32% | 1.37% |
| MgNiCo | .31% | .45% | .67% | .81% | 1.22% | 1.80% | 2.69% |

What is claimed is:

1. An electrochemical hydrogen storage cell comprising: a negative electrode comprising (Base Alloy)$_a$M'$_b$ where,
   Base Alloy is an alloy of Mg and Ni in a ratio of from about 1:2 to about 2:1;
   M' represents at least two modifier elements chosen from the group consisting of Co, Mn, Al, Fe, Cu, Mo, W, Cr, V, Ti, Zr, Sn, Th, Si, Zn, Li, Cd, Na, Pb, La, Mm, and Ca;
   b is greater than 0.5 atomic percent and less than 30 atomic percent;
and
   a+b=100 atomic percent
a positive electrode; and
a separator.

2. The electrochemical hydrogen storage cell of claim 1, wherein said at least two modifiers are chosen from the group consisting of Co, Mn, Al, Fe, and Cu.

3. The electrochemical hydrogen storage cell of claim 1, where b is less than 25 atomic percent of the final composition.

4. The electrochemical hydrogen storage cell of claim 1, where b is greater than 2.5 atomic percent is less than 20 atomic percent of the final composition.

5. The electrochemical hydrogen storage cell of claim 1, where said ratio of Mg and Ni is about 1:1.

6. The electrochemical hydrogen storage cell of claim 1, where said alloy has an amorphous microstructure.

7. The electrochemical hydrogen storage cell of claim 1, where said alloy has an amorphous/microcrystalline microstructure.

8. An electrochemical hydrogen storage material comprising:

(Base Alloy)$_a$Co$_b$Mn$_c$ where
   b=0.1 to 8.0 atomic percent;
   c=0.1 to 8.5 atomic percent;
   b+c≧0.5 atomic percent; and
   a+b+c=100 atomic percent.

9. The electrochemical hydrogen storage material of claim 8, where
   b=3.5 to 5.5 atomic percent, and
   c=4.5 to 8.5 atomic percent.

10. The electrochemical hydrogen storage material of claim 8, comprising (Base Alloy)$_a$Co$_b$Mn$_c$Al$_d$Cu$_e$ where
   b=0.1 to 10.0 atomic percent,
   c=0.1 to 10.0 atomic percent;
   d=0.1 to 10.0 atomic percent;
   e=0.1 to 10.0 atomic percent;
   b+c+d+e≧0.5 atomic percent; and
   a+b+c+d+e=100 atomic percent.

11. The electrochemical hydrogen storage material of claim 10, where
   b=2.0 to 8.5 atomic percent,
   c=2.5 to 8.5 atomic percent;
   d=2.5 to 8.5 atomic percent; and
   e=2.5 to 8.5 atomic percent.

12. An electrochemical hydrogen storage cell comprising: a negative electrode comprising:

(Base Alloy)$_a$Co$_b$Mn$_c$ where
   b=3.5 to 5.5 atomic percent,
   c=4.5 to 8.5 atomic percent;
   b+c≧0.5 atomic percent; and
   a+b+c=100 atomic percent
a positive electrode; and
a separator.

13. The electrochemical hydrogen storage cell of claim 12, where said negative electrode comprises:

(Base Alloy)$_a$Co$_b$Mn$_c$Al$_d$Cu$_e$ where
   b=2.0 to 8.5 atomic percent;
   c=2.5 to 8.5 atomic percent;
   d=2.5 to 8.5 atomic percent;
   e=2.5 to 8.5 atomic percent; and
   a+b+c+d+e=100 and atomic percent.

14. An electrochemical hydrogen storage material comprising:

(Base Alloy)$_a$M'$_b$ where,
   Base Alloy is an alloy of Mg and Ni in a ratio of from about 1:2 to about 2:1;
   M' represents at least two modifier elements chosen from the group consisting of Co, Mn, Al, Fe, and Cu;
   b is greater than 0.5 atomic percent and less than 30 atomic percent; and
   a+b=100 atomic percent.

15. An electrochemical hydrogen storage material comprising:

$$(\text{Base Alloy})_a M'_b$$

where,

Base Alloy is an alloy of Mg and Ni in a ratio of from about 1:2 to about 2:1;

M' represents at least two modifier elements chosen from the group consisting of Co, Mn, Al, Fe, Cu, Mo, W, Cr, V, Ti, Zr, Sn, Th, Si, Zn, Li, Cd, Na, Pb, La, Mm, and Ca;

b is greater than 0.5 atomic percent and less than 30 atomic percent;

a+b=100 atomic percent; and where said alloy has an amorphous or amorphous/microcrystalline microstructure.

* * * * *